United States Patent [19]

Assaf et al.

[11] Patent Number: 4,801,811
[45] Date of Patent: Jan. 31, 1989

[54] METHOD OF AND MEANS FOR GENERATING ELECTRICITY IN AN ARID ENVIRONMENT USING ELONGATED OPEN OR ENCLOSED DUCTS

[75] Inventors: Gad Assaf; Lucien Bronicki, both of Rehovot, Israel

[73] Assignee: Geophysical Engineering Co., Seattle, Wash.

[21] Appl. No.: 149,655

[22] Filed: May 14, 1980

[51] Int. Cl.[4] .............................................. F03G 7/04
[52] U.S. Cl. .................................... 290/55; 60/641.12
[58] Field of Search .................................... 290/43–44, 290/54–55; 60/398, 512, 515, 641; 416/DIG. 8

[56] References Cited

U.S. PATENT DOCUMENTS

| 1,633,460 | 6/1927 | Silvestrin | 290/55 |
| 2,072,752 | 3/1937 | Hirstius | 415/DIG. 8 |
| 3,436,908 | 4/1969 | Van Delic | 60/641 |
| 3,894,393 | 7/1975 | Carlson | 60/641 |
| 3,936,652 | 2/1976 | Levine | 290/2 |
| 4,134,708 | 1/1979 | Brauser et al. | 290/55 |

FOREIGN PATENT DOCUMENTS

| 3185 | 7/1979 | European Pat. Off. | 415/2 A |
| 2707343 | 8/1978 | Fed. Rep. of Germany | 60/398 |
| 988606 | 8/1951 | France | 415/DIG. 8 |
| 496215 | 7/1954 | Italy | 416/121 A |
| 7705793 | 11/1978 | Netherlands | 415/2 A |

Primary Examiner—William M. Shoop, Jr.
Assistant Examiner—W. E. Duncanson, Jr.
Attorney, Agent, or Firm—Sandler & Greenblum

[57] ABSTRACT

Electricity is generated in an arid environment using an open duct such as a canyon that is closed at one end and open at the other by erecting an air dam at the open end of the canyon and locating an air turbogenerator in the base of the dam. The air in the canyon is cooled by spraying water into the air as it enters the canyon, the cooled air flowing downwardly toward the base of the dam and through the turbogenerator.

Preferably, the air dam is a flexible curtain, covering the outlet of the canyon, and suspension means are provided for suspending the flexible curtain at its top. The suspension means include supports built into the canyon above the top of the curtain, the support preferably being a suspension cable suspended between towers on opposite sides of the canyon such that the top of the flexible curtain is supported by support cables carried by the suspension cable.

47 Claims, 6 Drawing Sheets

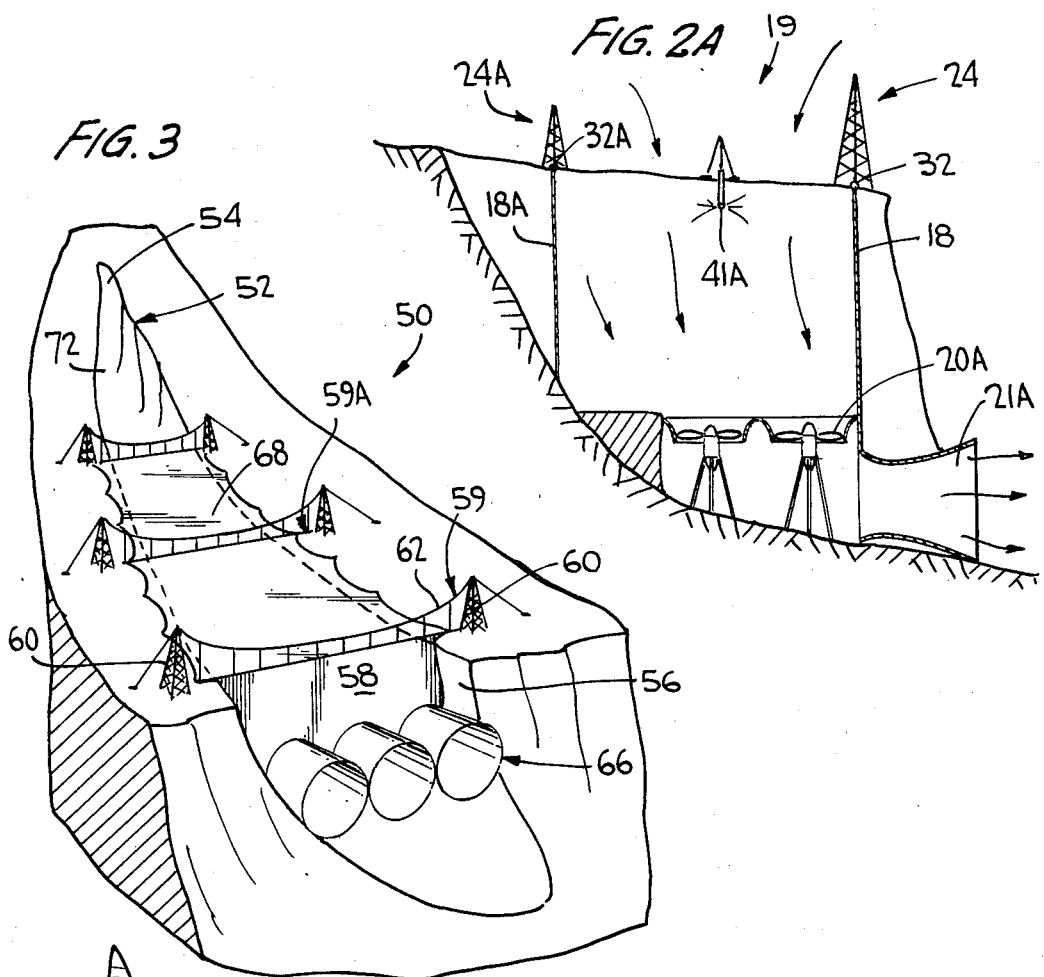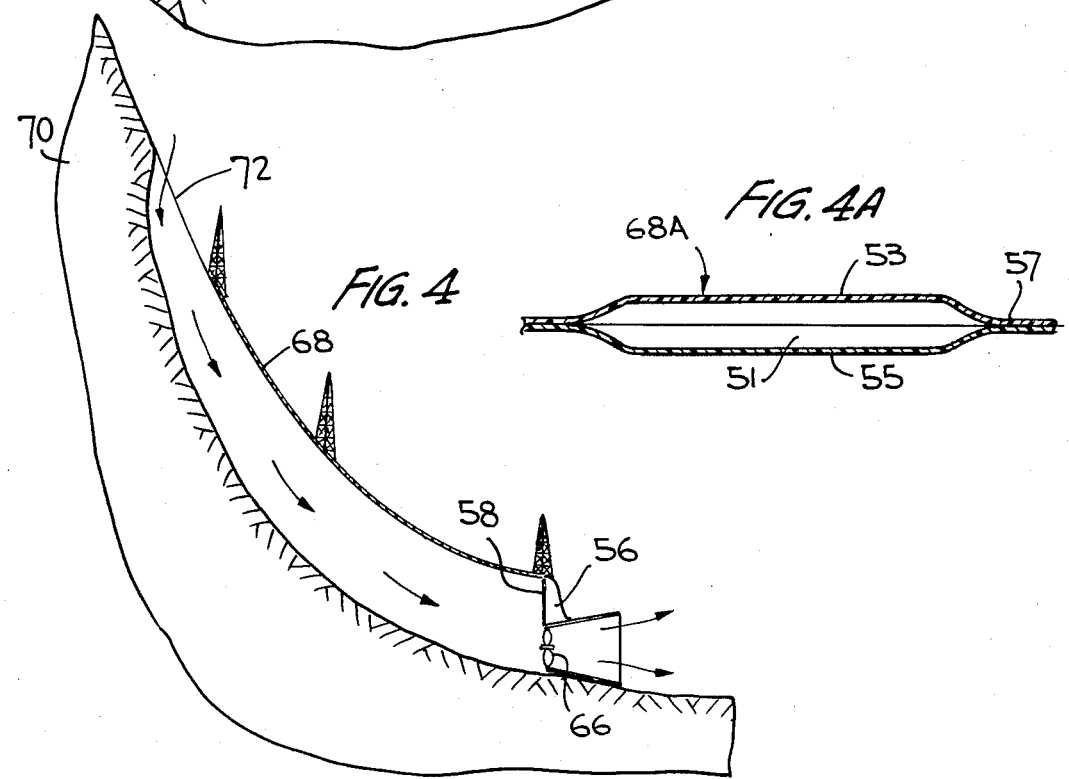

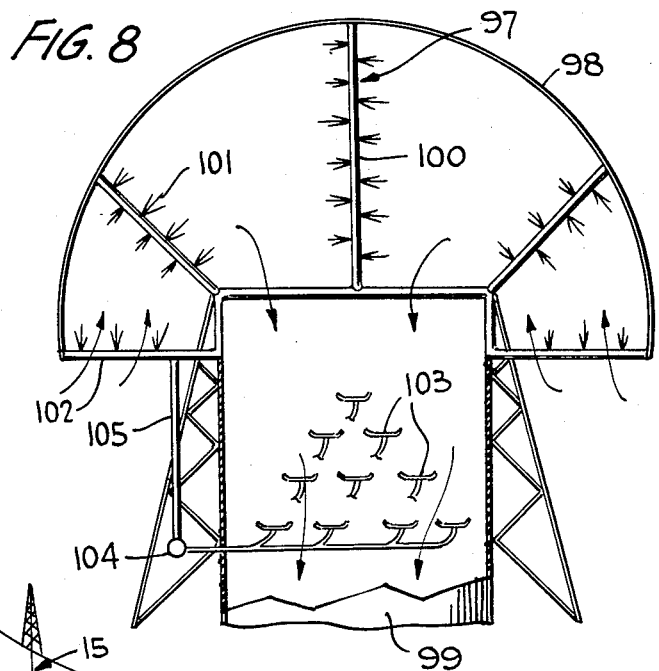
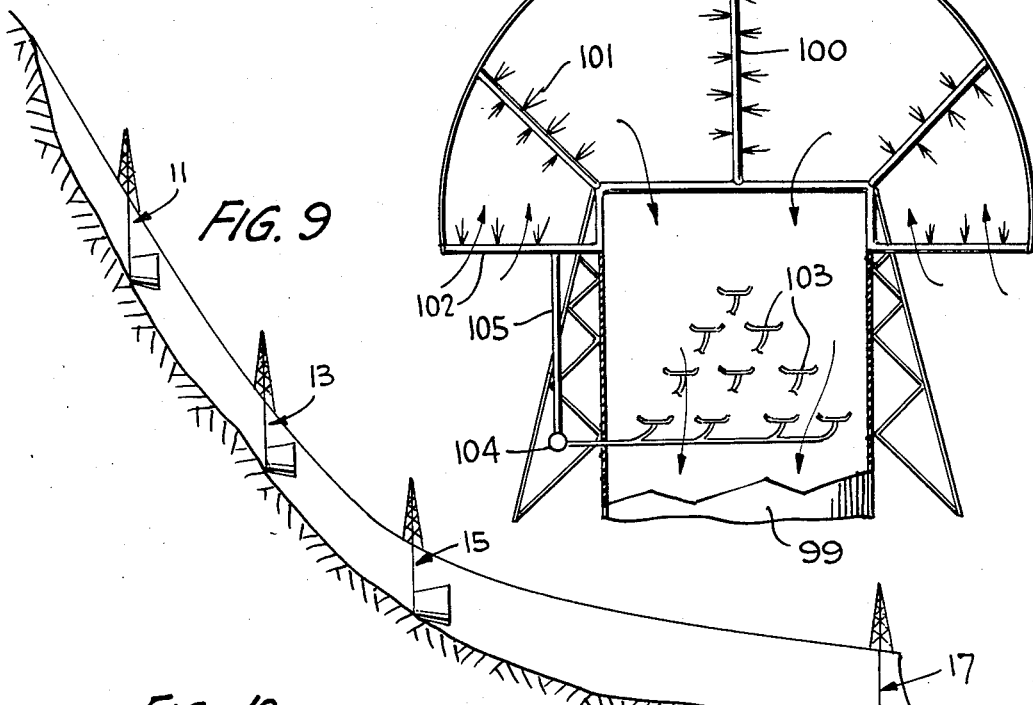
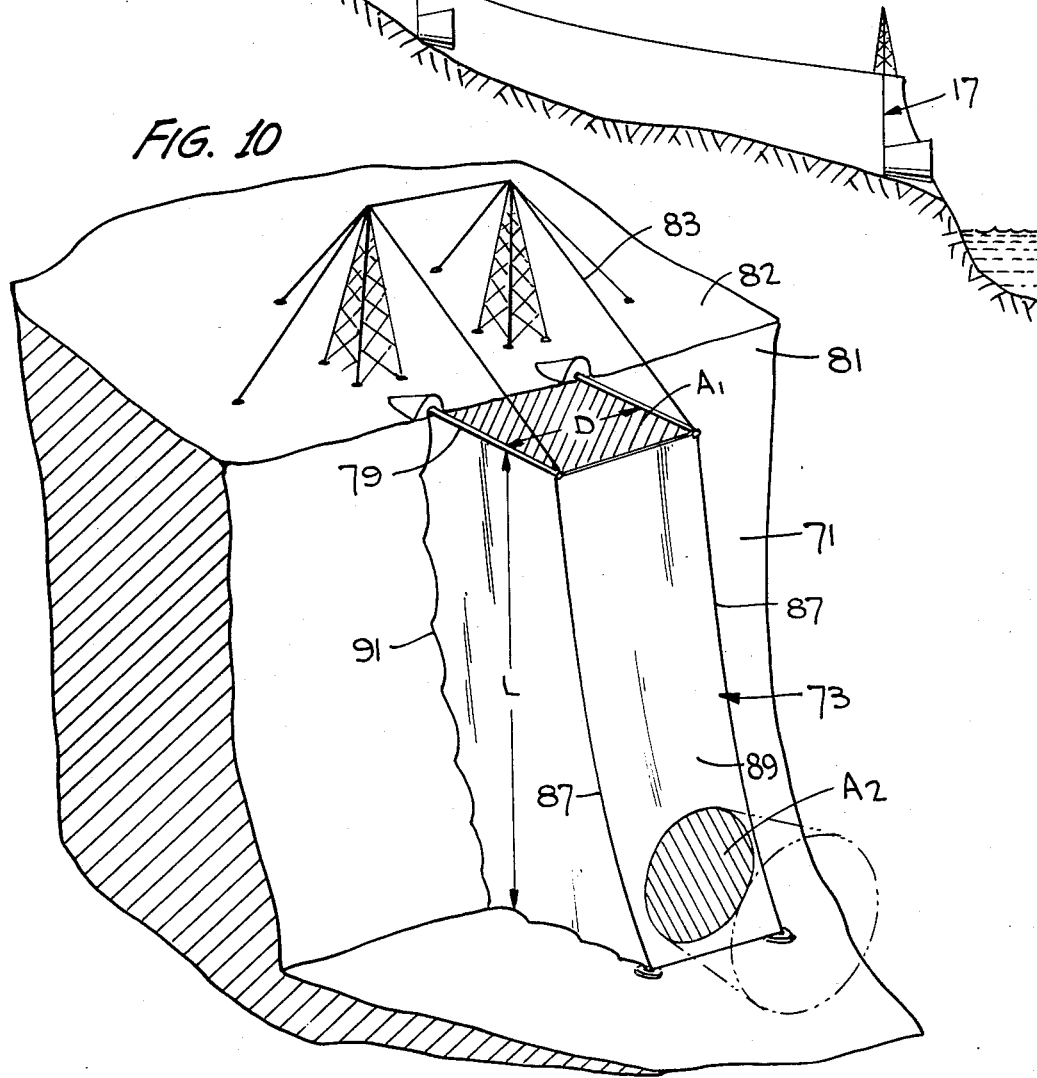

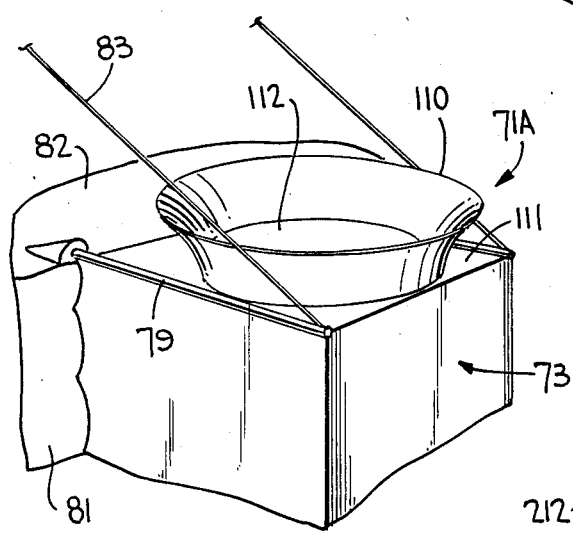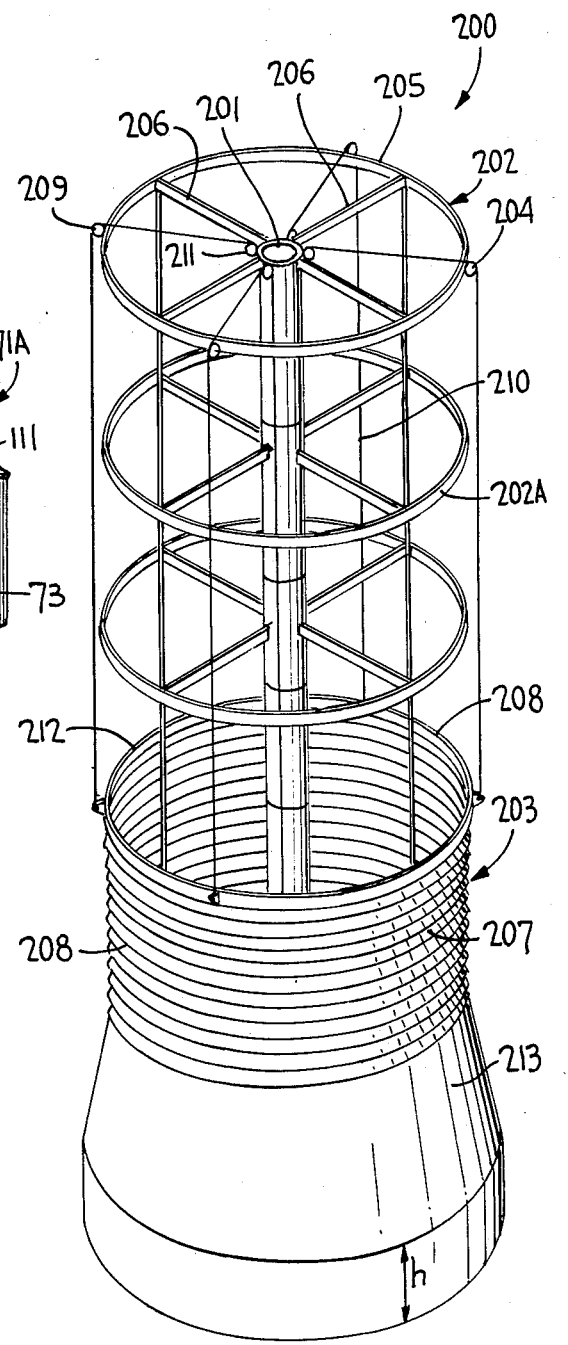

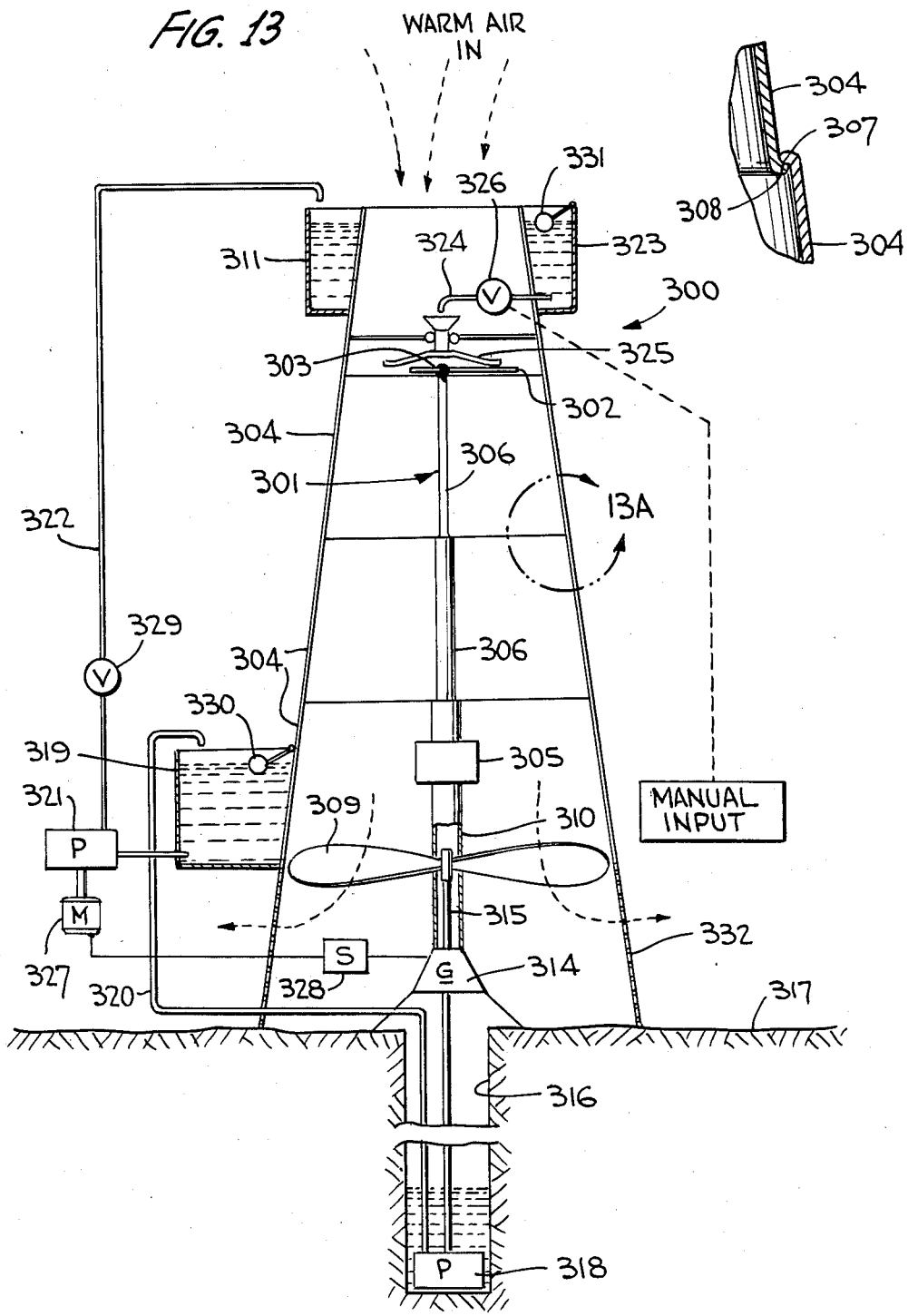

४,८०१,८११

METHOD OF AND MEANS FOR GENERATING ELECTRICITY IN AN ARID ENVIRONMENT USING ELONGATED OPEN OR ENCLOSED DUCTS

DESCRIPTION

1. TECHNICAL FIELD

This invention relates to a method of and means for generating electricity in an arid environment using elongated open or enclosed ducts.

2. BACKGROUND ART

U.S. Pat. No. 3,894,393 to Carlson discloses a vertically oriented enclosed duct in which relatively dry air entering the top of the duct is cooled by the evaporation of water sprayed into the air, the cooled air flowing downwardly in the duct and exiting at the bottom through an air turbogenerator. This technique is theoretically practical in an environment where the difference between dry and wet bulb temperature is about 10 degrees Centigrade, a situation typical for parts of Southwestern United States and the Middle East; but the technique has not been put to practical use, probably because the power output in the example described in the patent is unattainable given the parameters therein. For example, the patentee states that a duct, five miles long and 100 feet in diameter, located west of the Salton Sea in California, will provide 10 Mwatt power in excess of the work required to pump water from the base of the duct into the air at the top of the duct. This output is based on obtaining an air speed of about 70 knots at the exit using an exit area about one-half the size of the duct area, and spray droplets that are about 0.5 mm in diameter. Actually, the configuration proposed in the Carlson patent will produce no useful work because of the friction losses involved in the duct. The analysis in the patent fails to take proper account of the drag friction losses, of the decrease in evaporation rate as water droplets descend into the duct, and the independence of the exit velocity to the exit area of the duct.

The duct drag loss given in the equation at the top of column 5 of the Carlson patent is incorrect because it does not take into account the length of the duct and its diameter. The correct expression for the drag loss is obtained by multiplying the expression in the Carlson patent by the factor L/D which, for the Carlson example, is 266. The friction loss for a duct carrying air is a function of the coefficient of friction at the wall of the duct, the square of the velocity of the air in the duct, and the quantity L/D. For the example given in the Carlson patent in page 3, line 50, namely a conduit providing a head of 1450 m within which air flows at a velocity of 29 m/sec and experiences a 14.5 degrees Celcius temperature drop (i.e., a pressure head of 8 millibars), the friction loss will be 3.5 times the total pressure head. Thus, no useful work can be developed.

The time required to completely evaporate a droplet, as given in the equation in line 40 of column 6 of the Carlson patent, is incorrect because the equation fails to take into consideration the velocity of the droplets, which, in effect, is the relative velocity between the droplets and the air, and the decrease in the difference between the vapor pressure at the surface of a droplet and the vapor pressure of the air as the droplet size is reduced by evaporation during transit of the droplets in the duct. An analysis that takes these two factors into consideration reveals that the time required for a drop of 0.5 mm diameter to evaporate is approximately 1000 sec. Droplets of this size in an air mass where the drift velocity is 70 knots would require a duct over three times larger than that proposed in the Carlson patent in order to achieve complete evaporation of the droplets. Thus, only a fraction of the drop is evaporated with the result that only a fraction of the available temperature difference between the ambient air temperature and the wet bulb temperature will be available in the Carlson example, with the result that only a fraction of the theoretical power output will be available.

Finally, constricting the exit of the duct to increase the power intensity produced by the duct is an exercise in futility because the maximum velocity attained at the exit is not at all related to the exit area, but depends only on the height of the duct and the temperature difference between the ambient air and the temperature of the air about to exit the duct. Halving the exit cross-section will reduce efficiency by 50 percent but will not increase the exit velocity.

As a consequence of following the disclosure of Carlson, an enclosed, elongated duct appears to be impractical. Therefore, it is an object of the present invention to provide a new and improved method of and means for generating electricity in an arid environment using elongated open or enclosed ducts wherein significant net useful work is attainable.

DISCLOSURE OF INVENTION

The present invention provides a method for generating electricity in an arid environment using an open duct such as a canyon that is closed at one end and open at the other by erecting an air dam at the open end of the canyon and locating windmill/generator apparatus in the base of the dam. The air in the canyon is cooled by spraying water into the air as it enters the canyon, the cooled air flowing downwardly toward the base of the dam and through the windmill.

Preferably, the air dam is a flexible curtain, covering the outlet of the canyon, and suspension means are provided for suspending the flexible curtain at its top. The suspension means include supports built into the canyon above the top of the curtain, the support preferably being a suspension cable suspended between towers on opposite sides of the canyon such that the top of the flexible curtain is supported by support cables carried by the suspension cable.

When the elevation of the closed end of the canyon is greater than the elevation of the open end, a cover may be provided over the lower portion of the canyon to form an enclosed duct. In such case, suspension systems for the cover are built into the sides of the canyon above the cover much like the suspension system for the flexible curtain at the open end of the canyon. This arrangement increases the head on the windmills at the bottom of the air dam. To further increase the head, a vertical tower can be constructed surrounding the open end of the canyon allowing water to be sprayed into the air at the top of the tower.

The invention also consists of a system having an enclosed duct for generating electricity in an arid environment wherein the duct has a length L and a hydraulic diameter D. The tower is constructed such that L/D is less than a hundered and preferably less than ten in order to minimize drag friction losses. The size of the water droplets sprayed into the air is no greater than about 0.1 mm and the areas of the top and bottom openings are about equal. Such a tower can be constructed adjacent a cliff and suspended from the cliff at the top. In such case, the sides of the tower can be flexible curtains.

To increase the transit time of water evaporating in the system, air guides may be provided at the top of the tower, the water being sprayed into the air guides. To enhance evaporation, excess water is sprayed into the tower and the non-evaporated portion of the water droplets are collected near the top of the tower and recirculated as part of the spray.

BRIEF DESCRIPTION OF THE DRAWINGS

Embodiments of the present invention are shown in the accompanying drawings wherein:

FIG. 2A is a longitudinal sectional view similiar to FIG. 2 but showing modifications in the construction of the air dam and the positioning of the air turbogenerators;

FIG. 3 is a schematic perspective view of canyon wherein the elevation of the closed end is higher than the elevation of the open end, and the canyon is provided with a cover over the lower portion forming an enclosed duct;

FIG. 4 is a schematic cross-sectional view of the canyon shown in FIG. 3;

FIG. 4A is a sectional view through another embodiment of a cover like that shown in FIGS. 3 and 4;

FIG. 8 is a second embodiment of the construction for increasing the transit time of the air in the system;

FIG. 9 is a schematic cross-sectional view of a sloping canyon provided with a series of air dams and turbogenerators;

FIG. 10 is a schematic perspective view of a cliff showing a suspended enclosed duct in accordance with the present invention; and FIG. 11 is a perspective view of the top of a suspended, downdraft, enclosed duct like that of FIG. 10 but showing the air turbogenerator at the entrance to the duct;

FIG. 12 is a perspective view of another embodiment of downdraft duct; and

FIGS. 13 and 13A are still a further embodiment of downdraft duct.

BEST MODE FOR CARRYING OUT THE INVENTION

Figure 1:
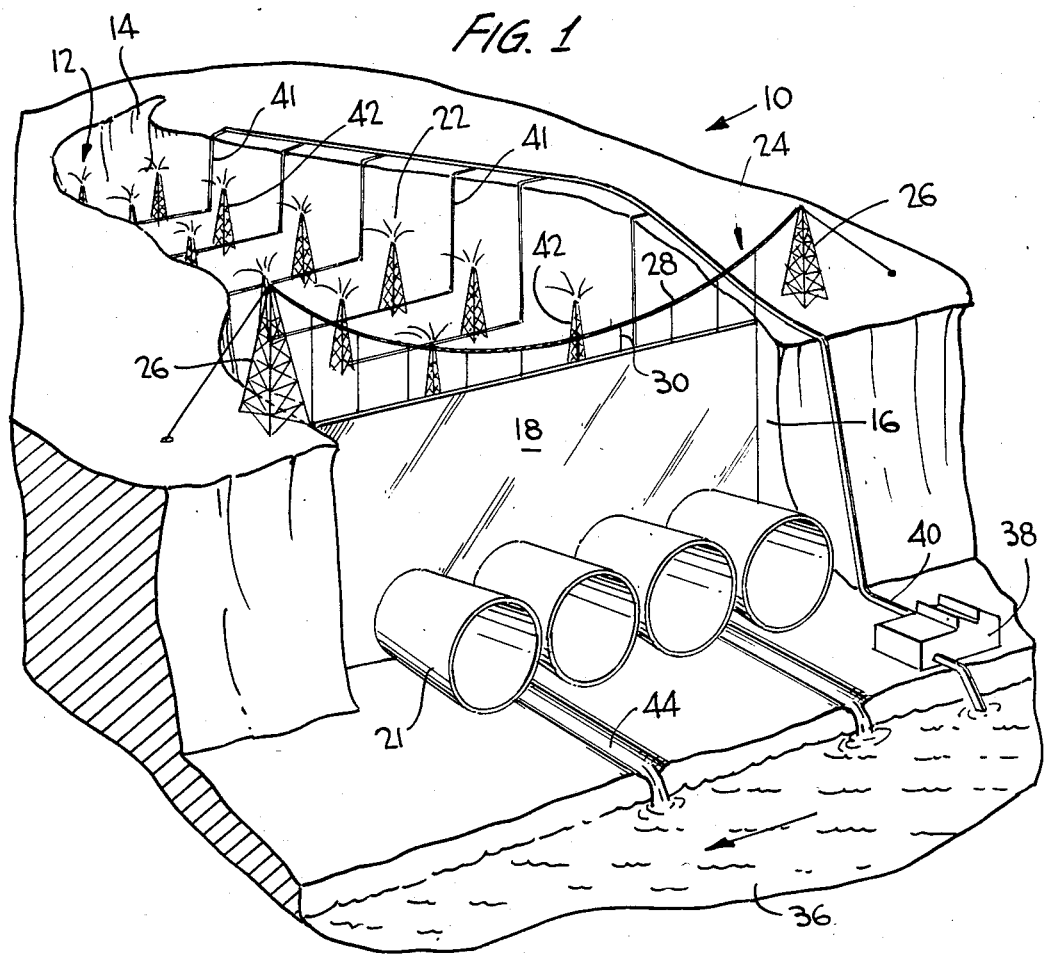
FIG. 1 is a perspective schematic view of a canyon closed at one end and open at the other and provided with a air dam at the open end of the canyon.

Referring now to FIG. 1 of the drawings, reference numeral 10 designates a system for generating electricity in an arid environment using an open duct such a canyon 12 which is narrow at closed end 14 and diverges into an enlarged open end 16. Air dam 18 is erected at enlarged 16 of the canyon, and water spray means 22 associated with the system are provided for spraying water into the air in the canyon whereby the air is cooled by the evaporation of the water forming a reservoir of relatively cool, dense, saturated air (as to compared to ambient air) contained by the air dam. The air reservoir so formed is analogous to a conventional aquatic reservoir in that a pressure head exists between the air inside the dam and the air outside. This head is utilized to generate elecricity by providing windmill/generator apparatus such as, for example, a plurality of air turbogenerators 20 (FIG. 2) located at the base of the dam. The cool, dense air, under the head established by the height of the dam, flows through the turbogenerators and is discharged into the warmer, less dense ambient air on the downstream side of the turbogenerators. Large scale diffusers 21 on the outward ends of the turbogenerators serve to recover the pressure drop across the turbogenerators thus increasing the efficiency of the conversion of the pressure head into useful energy.

Figure 2:
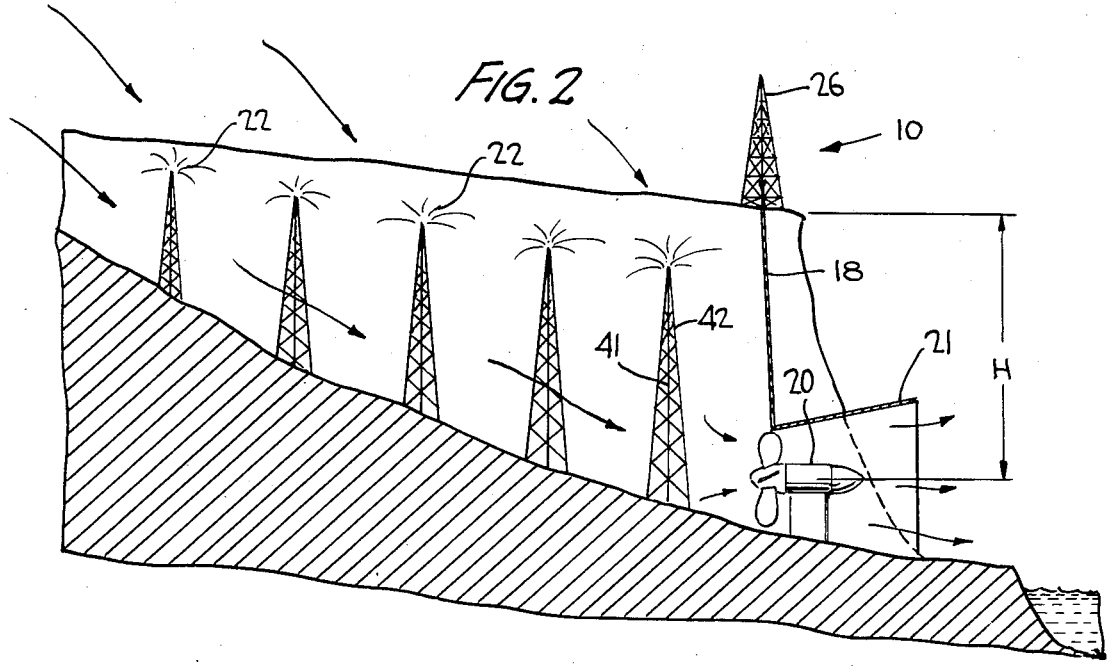
FIG. 2 is a longitudinal cross-section of the canyon shown in FIG. 1.

While turbogenerators 20 are shown as bladed axial flow fans coupled to electrical generators, the windmill/generator apparatus can take other forms. For example, the air flow path can be radial instead of axial and the flow can be as indicated in FIG. 2 or can be ducted. As used herein, the terms "windmill" or "windmill/generator" are intended to describe single or multiple stage wind-driven apparatus capable of converting an air-pressure head into shaft rotation, such apparatus being shrouded or unshrouded, and operating on the radial or axial flow principle. Also comprehended by these terms is the so-called "egg-beater" type of windmill.

Canyon 12 schematically represents canyons located in arid parts of the Southwestern portion of the United States, and wadis located in the Middle East where the difference between dry and wet bulb temperatures is typically about 10 degrees centigrade in the summer. Typically, canyon 12 will have a mouth several kilometers wide between cliffs several hundreds of meters in height.

While FIGS. 1 and 2 show the spraying of water at upper elevations where the air enters the dam, such spraying can be supplemented by lower level spraying in cases where the side walls of the canyon are very high. In such case, the air cooled by evaporation of water sprayed at the upper elevation of the dam will be compressed and heated as the denser air falls vertically toward the floor of the canyon. Supplemental spraying of water at lower levels has the beneficial effect of cooling the heated air and increasing the work output of the windmill apparatus at the base of the airdam.

It can be shown that the pressure difference $\Delta p$ across the air dam (i.e., the pressure differential or the pressure difference between the air upstream of the windmill and the ambient air downstream) is given by:

$$(1) \quad \Delta p = g(\Delta D_n)(H) = g(\Delta T)(H)(D_n)/T = g'(D_n)(H)$$

where g is the gravitational constant, $\Delta D_n$ is the difference in air density across the dam, H is the height of the dam, T is the absolute temperature of the air.

The maximum velocity $U_m$ attainable by the air passing through the windmills is given by:

$$(2) \quad U_m = (2g'H)^{\frac{1}{2}}$$

The theoretical power output P (not including the pumping power for the water spray) is:

$$(3)\quad P = 0.4(2g'H)^{1.5}D_n$$

If the power generating system is assumed to be 80% efficient, and taking into account the pumping power of the water, it can be shown that the power output of the system will be about 10 Kw per square meter of cross sectional area of the exit of the dam at the mouth of the canyon. Thus, for a canyon having a mouth of 6 Km across defined by cliffs 1.5 Km high, with an exit area defined by an opening 150 m high across the mouth, the expected output is about 10 Gigawatts.

The immense size of an air dam to generate power in the gigawatt range would appear to be a formidable obstacle to a practical adaptation of the concept of the present invention. However, because the working fluid in this case is air, the pressure difference across the dam is small enough to be sustained by plastic or fiber glass sheets or curtains which permit the structure of the dam itself to be relatively light in weight. Consequently, in the preferred embodiment of the invention, the air dam is constituted by a flexible curtain, such as plastic or fiberglass sheet material, and suspension means 24 provides for suspending the flexible curtain from its top much like a roadway is supported by a suspension bridge.

As shown in FIG. 1, suspension means 24 includes supports built into the canyon above the top of the curtain. Specifically, suspension means 24 includes a pair of suspension towers 26 atop the cliffs on opposite sides of the open end of the canyon, suspension cable 28 being strung across open end 16 of the canyon between the tops of the towers and a plurality of support cables 30 between the suspension cable and pipeline 32 to which the top of the flexible curtain is attached for supporting the same in covering relationship to the mouth of the canyon. Attachment means (not shown) are used to attach the edges 19 of the curtain to the walls of the canyon adjacent to its open end, and to the valley between the walls. Near the bottom of air curtain 18 are a plurality of openings for receiving windmill/generator aparatus 20.

In order to cool the air in canyon 12, water is pumped from a source, such as river 36, by pumps located in pump station 38. The output of the pumps is conducted by header pipeline 40 to a plurality of spray pipelines 4 which extend across the canyon and are suspended by suspension means 41. The pipelines spray water into the arid air which is cooled as the water droplets of the spray evaporate. The system operates most efficiently when the amount of water sprayed into the air is precisely equal to the amount of water needed to just saturate the air, and all the sprayed water is evaporated before the air passes through the windmills. In order to meet this requirement, the water droplet size and the location of the spray head become important.

From an analysis of the heat and mass transfer between a liquid spray and air, it can be shown that, for a 10 degree Centigrade difference between dry and wet bulb temperatures, the time required for the evaporation of 0.1 mm diameter droplets to reduce the temperature of the air by 9 degrees is about 18 seconds. In such case, the droplet radius is reduced by about half, and the difference in specific humidity is about 60%. About 50 seconds are required to evaporate 90% of the mass of the droplets when droplets are 0.2 mm in diameter, and 130 seconds for droplets of 0.4 mm in diameter.

This analysis takes into account the reduction in evaporation rate as the droplet size decreases and the air becomes wetter, and shows that the time interval for reducing the air temperature (and hence its density) to a given level increases as the square of the diameter of the droplets, although this relationship is modified somewhat by the resulting reduction in the Sherwood number of the droplets. Consequently, it is presently believed that spray towers should produce droplets of about 100 microns diameter and the the spray heads should be at a height of the order of magnitude of the elevation of the sides of the canyon to maximize the time the droplets will interact with the air before passing through the air turbines.

While many sites exist with a combination of a canyon as shown in FIG. 1, and a fresh water river, there are also many locations at which the water supply will be brackish. The present invention is also adapted to an environment in which the water is a salt water spray, but the use of brackish water in the spray presents two problems. One relates to the reduction in the rate of evaporation of droplet of salty water as the salt concentration of the droplet increases due to the evaporation of the fresh water component in the droplet. When the salt concentration exceeds a certain limit, the surface vapor pressure becomes smaller than the vapor pressure of the air, and further evaporation is precluded. The second problem deals with the disposal of the brine produced by the droplets that fail to evaporate.

If sea water of 4% salinity is available, and the exact amount of water which is needed to saturate the air is sprayed into the air, only about 80% of the theorical thermal head can be achieved. In other words, if the temperature difference between dry and wet bulb is 10 degrees Centigrade, and 4 grams of sea water of 4% salinity per kilogram of air are sprayed into the air, the temperature of the dry air will be reduced by only 8 degrees Centigrade and not 10 degrees Centigrade; and about 20% of the sea water will remain as a concentrated brine.

To improve the thermal head, more water than is theoretically needed to saturate the air can be sprayed into the canyon. The improvement in thermal head is paid for in the added pumping costs. The optimum amount of brackish water is approximately 120% of the theoretical amount of fresh water needed; and in this case, about 90% of the theoretical thermal head will be achieved; and the output will be about 80% of the output as compared with using fresh water.

The production of concentrated brine by reason of the evaporation of the brackish water in the air dam may be advantageous because valuable constituents in the concentrated brine can be extracted. Otherwise, the brine can be discharged into the water source.

Where a canyon is open at both ends, it can be dammed at two intermediate locations as shown in FIG. 2A to form a reservoir between the cliffs of the canyon. Here, dam 18 at the mouth of the canyon is the same as shown in FIGS. 1 and 2; but auxiliary dam 18A is constructed in like manner further into the canyon thus defining limited volume dam 19. Dam 18A thus includes pipeline 32A suspended across the canyon by suspension means 24A for supporting a flexible cover that separates air in the dam from the remainder of the air in the canyon, and one or more pipelines 41A intermediate dams 18 and 18A. Water furnished to pipelines 32, 32A and 42A is sprayed into the air in the dam thereby cooling the air and causing it to flow downwardly through a plurality of vertical axis wind driven aparatus 20A built into a horizontally disposed structure at the bottom of the dam adjacent the lower end of the dam. To increase the efficiency of the wind driven apparatus, large scale diffusers 21A are provided to exhaust the apparatus into the ambient air.

In some locations, very narrow but long canyons are present in arid environments. In such case, the mouth of the canyon is defined by walls whose height is of the same order of magnitude as the width of the mouth providing a relatively small cross-sectional area of the dam which would limit the power output. In these cases, where the canyon is in mountainous terrain and slopes upwardly from a relatively high altitude as indicated in FIGS. 3 and 4, the present invention can be utilized by covering the lower portion of the canyon in order to effectively increase the aerostatic head on the turbines.

As shown in FIG. 3, system 50 designates a system for generating electricity in an arid environment using a downwardly sloping canyon 52 which is narrow at its closed end 54 and diverges to a larger opening 56 at an elevation significantly lower than the elevation of the closed end. Located in opening 56 is air dam 58 in the form of a flexible curtain suspended from the top as in the manner indicated in FIG. 1 by suspension means 59 which include a pair of towers 60 carrying suspension cable 62 and a plurality of support cables 64 that are spaced across the top of flexible curtain 58 for supporting the same. A plurality of air turbines 66 are located at the base of the air dam for discharging the air. Cover 68 extending from the sides of the canyon and suitably attached to the top surface of the terrain extend partially up the mountain 70 thus covering the lower portion of the canyon. Opening 72 in cover 68 is at a higher elevation than flexible curtain 58 thus providing a significantly greater head for the cool air which passes through windmill/generators 66.

In order to maintain the cover across the top of the canyon, a plurality of suspension means 59A are provided. These suspension means are similar to the suspension means 59 in that the cover is supported from its top surface across the width of the canyon. Additional fastening means (not shown) are used to attach the cover to the sides of the canyon.

To assist in maintaining the cover suspended over the canyon, the cover can be constructed to be inflatable as indicated in FIG. 4A which shows cover 68A as including a pair of overlying sheets 53, 55 defining a plurality of enclosed, gas-tight pockets 51. These pockets can be filled with a lighter than air gas such as helium for assisting in suspending the cover over the canyon. In use, the uninflated cover is spread out over the floor of the canyon, and then inflated. The inflated cover will then rise toward the top of the canyon, where it will be captured by the cable structure 59A shown in FIG. 3. Thus, the cable structure in this case serves to hold down the cover as compared to the cable structure of FIG. 3 which supports the cover.

In operation, the principles described in connection with FIGS. 1 and 2 are applicable to the embodiment shown in FIGS. 3 and 4. In this case, however, the cover amounts to a superstructure which increases the head available for the air.

FIG. 9 shows a serial combination of systems like that shown in FIGS. 1-4 applied to a canyon that extends from a mountain to a lower level. In this case, series of separate air dams 11, 13, 15, 17 are provided, each air dam being at a lower level than the preceeding dam, and the air being successively cooled in stages until reaching the lower most dam which is configured like that of FIGS. 3 and 4.

Figure 5:
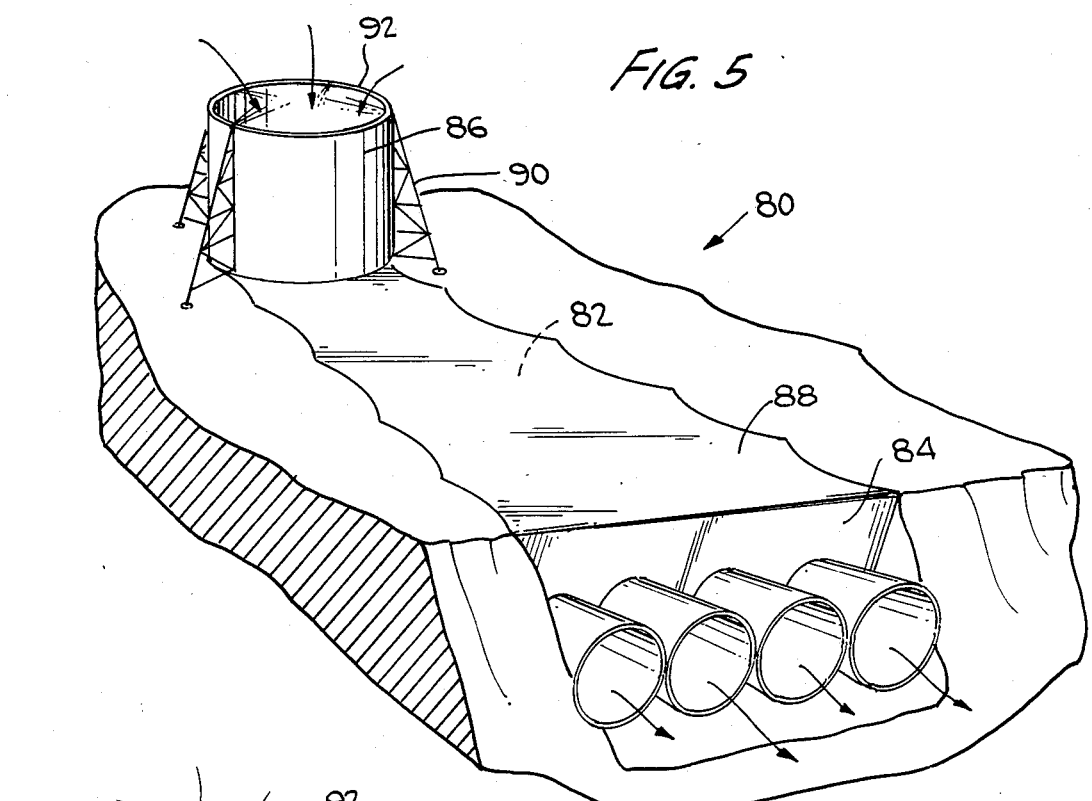
FIG. 5 is a schematic perspective view of canyon whose open end is closed by an air dam which is covered in a manner similar to that in FIG. 3 but provided with a tower surrounding the open portion of the canyon.
Figure 6:
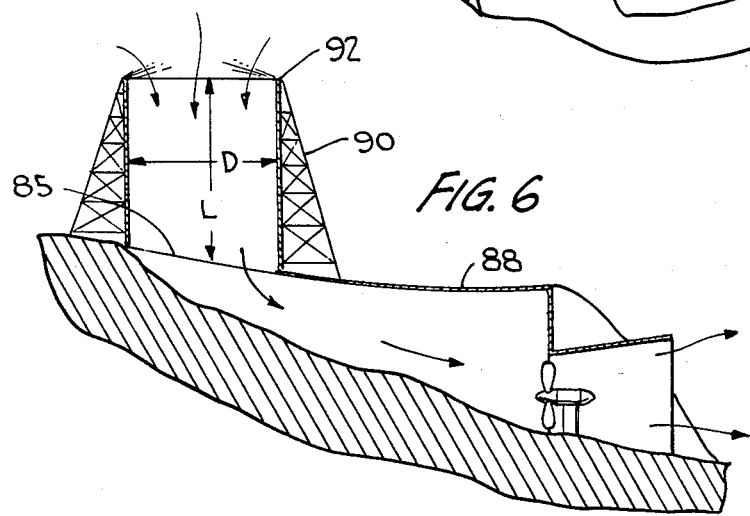
FIG. 6 is a schematic cross-sectional view of the canyon shown in FIG. 5.

The arrangement shown in FIGS. 3 and 4 can be employed in less mountainous terrain as indicated in FIGS. 5 and 6 wherein the canyon is in a pleateau of substantially uniform height. In FIG. 5, reference numeral 80 designates a system for generating electricity in an arid environment using canyon 82 which has an air dam 84 at the open end of the canyon and a tower 86 constructed at the closed end of the canyon. While not shown in the drawing, air dam 84 is suspended from the top as in the case of the arrangement shown in FIGS. 1-4. In addition, cover 88 extends from the sides of the canyon from the air dam terminating just short of the closed end in the manner illustrated in FIGS. 3 and 4. In this case, however, the terrain containing the canyon is relatively flat, and tower 86 over the opening 85 in the cover provides the additional head necessary for increasing the intensity of the airflow through the air turbogenerators located in air curtain (not shown).

Tower 86 is constructed of plastic or fiber glass sheets suspended from a skeleton build into the surface of the canyon adjacent the closed end. The skeleton comprises a plurality of metal towers 90 which support a hooped pipe-structure 92 at the top of the tower for the purpose of providing a suspension, much like a shower curtain rod, for the sheet material that defines the tower. This skeleton structure also carries the necessary water piping which sprays water into the open end of the tower in a manner indicated in Carlson Pat. No. 3,894,393 referred to above. In this case, however, the tower has a configuration which minimizes surface drag. The ratio of the height of the tower L to its hydraulic diameter D is such that the ratio is less than 100 and preferably less than about 10. Furthermore, the diameter of the droplets of the water spray injected into the top of the tower are about 0.1 mm in order to enhance the rate at which these droplets will interact with the air to increase its humidity and lower its temperature.

Figure 7:
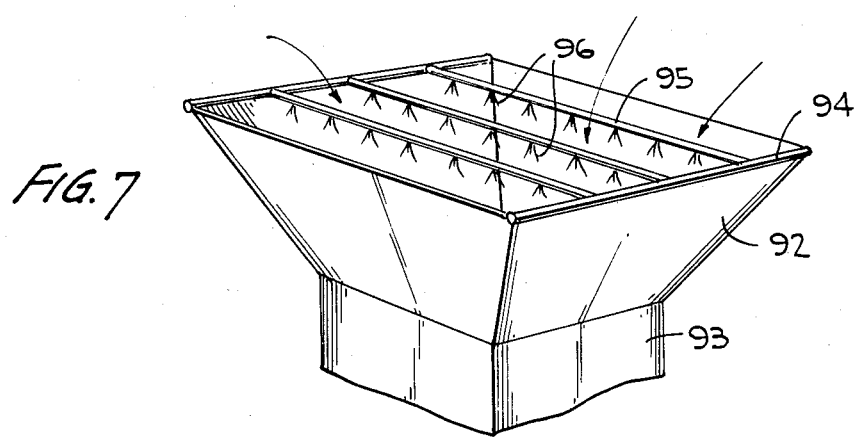
FIG. 7 is a schematic perspective view of an arrangement for the top of a tower such as that shown in FIG. 5 provided with a construction that surrounds the open end of the tower for increasing the transit time of the air in the system.

In order to further increase the transit time of the air in the system, thereby increasing the time during which the water spray remains in contact with the air, the top of the tower shown in FIGS. 5 and 6 can be provided with an inlet diffuser or air guide, two embodiments of which are shown in FIGS. 7 and 8. In FIG. 7, the air guide includes an upwardly opening funnel shaped construction 92 surrounding the top of tower 93 thus forming a diffuser section for the air inlet to the tower. Instead of spraying water into the open end of the tower, the construction 92 is provided with manifolds 94 which carry water to the transversely extending pipes 95 containing a plurality pf spray heads that direct spray 96 downwardly, and perhaps also upwardly with respect to the pipes. The air drawn into the tower by the circulation established by the system passes through the spray mist carrying the spray downwardly into the tower.

Another embodiment of means for increasing the time during which the spray remains in contact with the air is shown in FIG. 8 in the form of a hemispherical skeleton frame 97 which is covered with thin flexible material 98, such as a plastic film or the like, thereby forming an enlarged air inlet for the air entering tower 99. Frame 97 includes a plurality of pipes 100 provided with spray nozzles for the purpose of producing a plurality of sprays 101 which mix with the air entering through the open angular region 102 of the hemispherical shaped covering.

In order to enhance the evaporation, a plurality of collectors 103 are located near the open upper end of tower 99 for the purpose of collecting water droplets that are present in the air as it travels downwardly through the tower and into the duct, the collectors 103 emptying into a header 104. A pump, not shown, pumps the water in header 104 into vertical pipe 105 which delivers the water into pipes 100 thereby recirculating the collected water into the spray.

The present invention is also applicable to an enclosed vertically oriented duct such as disclosed in Carlson Pat. No. 3,894,393 separate from the canyon configuration described above. FIG. 10 shows system 71 for generating electricity in an arid environment using a generally vertical duct 73 of length L and a hydraulic diameter D (where D=4A/C, A being the area of the duct and C being the perimeter of the duct) with an opening 75 at the top for warm air to enter and an opening 77 near the bottom for cool air to exit through windmill/generator apparatus (not shown). Spray means 79 at the top of the tower spray droplets of water into the air entering opening 75 which may be surrounded by an air diffuser such as shown in FIG. 7 or 8.

The improvement over the CARLSON patent lies in constructing the tower so that L/D is less than 100, and is preferably less than or equal to about 10 in order to reduce drag losses in the duct to a small percentage of the power output of the system. Another improvement over the CARLSON concept lies in limiting the size of the water droplets to no greater than about 0.1 mm in diameter in order to reduce the time required for most of the droplets to evaporate given the drift velocity of the droplets in a tower of reasonable elevation under ambient weather conditions described above. Finally, another improvement over the CARLSON concept lies in making the areas of the top and bottom opening 75 and 77 substantially equal in order to maximize the power output as a function of the physical size of the system.

The present invention also lies in the constructional technique for building a duct of length in the hundreds of meters and a diameter in the tens of meters in order to generate large quantities of power. In a downdraft chimney of the type described above, it can be shown that the maximum mechanical power attainable (under the conditions described above) is given by equation (3). In this case, the area is the area of the inlet/outlet openings.

To achieve a large scale duct capable of generating large quantities of power, a cliff 81 many hundreds of meters high in an arid environment may be utilized. Suspended over the side of the cliff in cantilever fashion is U-shaped pipe configuration 79 supported by suspension system 83 built into top 82 of the cliff. Steel guy-wires 87 connected to the free end of configuration 79 are anchored in the general at the base of the cliff for forming a semi-rigid frame covered with a flexible material 89 such as plastic or fiber glass. The vertical edges 91 of the flexible material are fastened to the vertical face of the cliff.

Alternative to the construction shown in FIG. 10, system 71A has the windmill/generator apparatus located at the inlet to duct 73 rather than at the outlet. In system 71A, annular inlet diffuser 110 is supported on structure 111 which is suspended between pipe configuration 79 at top 82 of cliff 81 and is held in place by suspension system 83. Mounted coaxially with diffuser 110 is vertically rotatable windmill apparatus 112.

System 71A is located in an arid environment so that the spraying of water inside duct 73 cools air entering the duct through the windmill apparatus as in the CARLSON patent. In this case however, the air passing through the windmill apparatus is free of droplets and thus the performance and maintenance of the device shown in FIG. 11 may be improved over the device shown in FIG. 10.

The construction technique shown in systems 71 and 71A, which are concerned with downdraft chimneys for use in arid environments, is also applicable to updraft chimneys of the type disclosed in U.S. Pat. No. 3,436,908. That is to say, the construction technique shown in FIGS. 10 and 11 can be applied to any open cycle heat engine that utilizes an elongated, generally vertically disposed conduit for creating a heat induced positive buoyancy flux (hereinafter referred to as an open cycle heat engine of the type described). Such a flux (which is described in detail below) is created either by cooling the air in the conduit near the top or by heating the air in the conduit near the bottom. In such an open cycle heat engine, the novel construction technique involves suspending the conduit from terrain located above the bottom of the conduit. This technique is ideally suited to open cycle heat engines of the type described because the conduit, bearing no loads, is lightweight in construction and merely serves to isolate a limited volume of air in the environment for creating a heat induced positive buoyancy flux.

The term "positive buoyancy flux" can be explained by considering two situations, one where air in a vertical conduit is heated near the bottom of the conduit, and the other where air in a vertical conduit is cooled near the top of the conduit. While these two systems appear to be fundamentally different, each produces an environmental positive buoyancy flux.

Consider a horizontal reference plane passing through the environment surrounding the conduit and through the conduit itself. In the case where the volume of air in the conduit is heated near the bottom of the conduit and rises toward the top, the upward volume flux of light air in the conduit is accompanied by an equal but downward volume flux of heavier air in the environment. If other factors (like heating the air at the bottom) were excluded, the net effect of changes in volume flux would be an increase in air density in the environment below the reference plane and a decrease in air density above the plane.

In the case where the air in the conduit is cooled near the top of the conduit and flows downwardly toward the bottom, the downward volume flux of heavy air in the conduit is accompanied by an equal but upward volume flux of lighter air in the environment. If other factors (like cooling the air at the top) were excluded, the net effect of these changes in volume flux would be the same as in the previous case, namely an increase in air density in the environment below the reference plane. The phenomenon common to both cases is a downward mass flux across the reference plane. This implies the existence, in an open cycle heat engine of the type described, of an upward buoyancy flux.

Duct 73 provides a buoyancy tower for generating power, the necessary air flow being downward when the air is cooled near the top of the tower. As indicated in equations (1) to (3) herein, the head H is the single most significant factor in designing a buoyancy tower. That is to say, the height of the tower will determine the amount of power that can be generated.

Techniques for constructing large towers are well known; but most enclosed towers for conventional purposes, such as cooling towers for nuclear power plants, or chimneys for fossil fueled power plants, are massive structures whose sheer mass provides resistance to wind forces. Buoyancy towers differ from conventional towers mainly in requiring a structure of large volume which needs only light-weight walls to insolate a vertical air duct from the environment in order to permit the low order heating or cooling of the air to the air to take place within the tower.

A free-standing buoyancy tower according to the present invention can be constructed in the manner shown in FIG. 12, wherein reference numeral 200 designates the tower. Tower 200 comprises a central core 201, a top hoop 202 attached to the free end of the core and a plurality of similar hoops 202A spaced vertically on the core, flexible curtain 203, and mechanism 204 for selectively raising and lowering the curtain. Core 201 is tubular in nature and preferably is a pipe which provides rigidity to the tower. Hoops 202 and 202A are in the form of circumferential band 205 supported by a plurality of radial spokes 206. Curtain 203 is vertically articulated, being formed like an accordion of light-weight flexible material 207 such as fiber glass, or plastic sheet, or even woven fabric such as nylon or polyester, with metallic hoops 208 attached at spaced intervals to the flexible material. Mechanism 204 includes plurality of pulleys 209 mounted on the uppermost hoop 202, and flexible cables 210 extending from a region near the bottom of the tower to the top of the tower where they pass over pulleys 211 mounted on core 201 and downwardly to the top edge 212 of the hoop 208 defining the upper end of cover 203.

In use, the actuation of cables 210 will deploy the cover from its retracted position shown in FIG. 12 to its extended position where the hoop 208 abuts top hoop 202. In its extended position, the cover will define a buoyancy tower suitable for either an updraft or downdraft chimney. When used as a downdraft chimney, core 201 provides clearance for water pipes (not shown) that are connected to spray heads (not shown) attached to top hoop 202, and a mounting for a vertical axis air turbogenerator (not shown) at the base of the tower. In such case, the air exits from the tower in a horizontal direction by providing bell-shaped diffuser 213 adjacent to but spaced from the bottom of the towers and forming the bottom connector to curtain 203. Diffuser 213 is spaced a distance h from the ground. Preferably h=D/2 where D is the diameter of the tower at the throat. Frictional losses in the tower are minimized when L/D is less than 100, where L is the height of the tower. Preferably, L/D is less than 10.

When the wind loads on the tower exceed a threshold, the operation of the tower is suspended and cables 210 are actuated to lower the cover 203. By reason of the articulated nature of the cover, it will collapse on itself as cables 210 are played out. When fully retracted, the cover will rest on diffuser 213; and the tower will present a minimum cross-section to the wind. When normal weather conditions return, the cover can be redeployed and power operation resumed.

Instead of lowering the cover to reduce wind loading, the cover can be mounted on glides on a circular track attached to hoop 202 much like a shower curtain is mounted on a rod. In this case, the cover is deployed and retracted by sliding the glides on the track.

As a further alternative, core 201 could be in the form of a plurality of telescoping tubes. In such case, the uppermost tube would be rigidly attached to top hoop 208.

The performance available of such a tower could be as follows:

$$(4) \qquad N = (D_n)/2[2g(\Delta T/T)]^{1.5} (0.8 - (1.2C_aT)/L_t)$$

where N is the power generated per unit cross-sectional area of the tower, $D_a$ is the average air density, g is the gravity constant, $\Delta T$ is the environmental air temperature, $C_a$ is the specific heat of air, and $L_t$ is the latent heat flux of water. If the difference between dry and wet bulb temperature is 10 degrees Centigrade, the use of seawater will reduce the thermal head to about 9 degrees. Assuming a pump efficiency of 80%, the expected performance of the downdraft tower is as follows:

| Height m | Dim. m | U m/sec | N watt/m² | P KW |
| --- | --- | --- | --- | --- |
| 30 | 12 | 4 | 30 | 3.3 |
| 50 | 20 | 5.5 | 64 | 20.4 |
| 75 | 30 | 6.7 | 117 | 83 |
| 100 | 40 | 7.7 | 181 | 364 |
| 150 | 60 | 9.4 | 333 | 1500 |
| 200 | 80 | 11.0 | 512 | 2580 |
| 250 | 100 | 12.2 | 716 | 5600 |

Another embodiment of a free standing buoyancy tower, in accordance with the present invention, is shown in FIG. 13 wherein the tower is used as a self-contained pump for a well. Tower 300 comprises central core 301, support 302 on the free end 303 of the core, a plurality of conical tubular shells 304 of fiberglass or sheet metal, and mechanism 305 for selectively raising and lowering shells 304. Core 301 is in the form of a plurality of telescoping tubes 306 selectively retractable from their deployed or extended position shown in the drawing to a stowed position wherein the tubes are telescoped one within the other. Mechanism 305 may be electrically operated, but preferably is mechanically or hydraulically operable similar to the manner in which an automobile jack is operable.

Support 302 on the free end of the uppermost one of tubes 306 is rigidly connected to the uppermost one of shells 304 all of which are slightly tapered such that the diameter of a shell at its lower is greater than the diameter of the shell at it upper end. The taper in the drawing is greatly exagerated for illustration purposes.

The upper end of each shell is provided with an internal peripheral flange 307 while the lower end of each shell is provided with an out-turned peripheral flange 308; and the sizes of the shells progressively decrease from the lowermost to the uppermost shell. As a consequence of this arrangement, the shells are nestable, one within the other, when tubes 306 are retracted to their stowed position. The shells are thus analogous to the portions of a metallic, collapsible drinking cup. When the shells are extended, they form an articulated cover that defines a vertically disposed duct.

Located below mechanism 305 controlling the telescoping of the shells is vertical-axis windmill 309 mounted on pedestal 310, the plane of rotation of the windmill being sufficiently above ground level to accomodate the exhaust air flow through the windmill. Electric generator 314 is mounted within the pedestal and is directly coupled to the windmill via shaft 315 which extends into well 316 below ground level 317 on which the tower is built. The lower end of shaft 315 is coupled to submerged water pump 318 at the bottom of the well. Thus, windmill 309 is mechanically coupled by shaft 315 directly to both generator 314 and pump 318 with the result that generator 314 produces electricity and pump 318 pumps water from the well whenever windmill 309 rotates.

When pump 318 operates, water from the well is pumped into main reservoir 319 via pipeline 320. Reservoir 319 is symbolically representative of a water supply system such as an irrigation system which is supplied by water from well 316. Pump 321 is connected to main reservoir 319; and when this pump operates, water from the main reservoir is transferred by pipe 322 into spray reservoir 323 which is defined by annular covering 311 attached to the upper end of uppermost shell 304. Outlet pipe 324 extends radially into shell 304 and is connected to the bottom of spray reservoir 323. Pipe 324 has a downturned spout at its free end located along the center-line of the tower for the purpose of transfering water from the spray reservoir into the tower under the control of valve 326. This valve is shown as being manually operable inasmuch as the system shown in the drawing is a manual one. However, as indicated below, the system can be automated.

Directly below the downturned spout on pipe 324 is the inlet to spray head 325 which is mounted for rotation about a vertical axis coinciding with the axis of the tower. The gravity head on the water in rotary spray 325 is such that the exit of the water through the orifices in the spray head is such as to impart rotation to the spray head thereby evenly distributing water droplets over the entire cross-section of the tower at the top thereof. Warm arid air in the tower is thus cooled and increases in density falling to the bottom of the tower through windmill 309 thereby rotating the same.

Motive power for pump 321 is supplied by motor 327 coupled to the pump, this motor running whenever generator 314 is operating and switch 328 is closed. To control the rate at which water is transfered from main reservoir 319 to spray reseroir 323, valve 329 may be provided in pipe 322. This valve can be manually adjustable in order to simplify the operation of the system, although an electrically operated valve could also be employed.

Float valves 330 in the main reservoir and 311 in the spray reservoir are provided for the purpose of sensing the level of water in the respective reservoirs and controlling switches which can be utilized for automating the operation of the tower. The logical connection of switches 330, 331, switch 328, and a solenoid (not shown) for operating valve 326 can be provided in order to automate the operation of the tower. That is to say, the logical connection between these elements would be such that the operation of windmill 309 would not be terminated unless spray reservoir 323 is filled as sensed by float switch 331. Furthermore, in order to prevent the overflowing of reservoir 319, float switch 330 can be utilized for the purpose of closing valve 326 when the height of the liquid in the main reservoir reaches a threshold. In this way, the flow of water into the tower would be terminated thereby preventing warm air entering the top of the tower from being cooled and halting significant air flow through windmill 309.

Alternative to the direct connection between windmill 309 and generator 314 and pump 318, an alternative arrangement could be provided in which manually operated clutches are provided between the generator and the pump on the one hand and the output shaft 315 of the windmill on the other hand. In a still further modification, a belt drive could be provided linking the windmill with the generator and with the pump. This is particularly advantageous in a system that would simplify maintenance, but which would still provide a significant manual control between the output of the windmill and the generator and the pump.

In the quiescent state of the tower as shown in FIG. 13, reservoir 323 is filled, valve 326 is closed, and windmill 309 is idle. In addition, generator 314, pump 318 and motor 327 are idle. In order to initiate operation of the tower, valve 326 is manually opened permiting water in spray reservoir 323 to flow through pipe 324 into the inlet of rotary spray 325. As indicated above, the gravity head on the water entering the rotary spray is such as to impart rotation to the spray head as the water exits therefrom. The water droplets in the top of the tower cool the hot humid air entering through the open top causing the air to fall downwardly through the tower. The rotation of the spray head also induces a spiral movement in the air stream flowing downwardly into the windmill, such spiral movement serving to induce initial rotation of the windmill. Eventually windmill 309 begins to rotate and the air exits through openings 332 at the bottom of the tower.

As soon as the rotation speed of the windmill reaches a threshold, generator 314 begins to generate electricity energizing motor 327 (provided switch 328 is closed) and causing pump 321 to replenish water in the spray reservoir. In addition, a pump 318 becomes effective to pump water into the main reservoir. Generator 314 will also be available to generate electricity for purposes other than running motor 327 and in such case it would desirable to provide a mechanical means for selectively decoupling shaft 315 from pump 318. This modification would permit the tower to be used for pumping water, or generating electricity, or for both purposes simultaneous.

When it is desired to terminate operation of the tower, valve 326 is closed thereby depriving the tower of cooling water with the result that vertical air flow through the tower is terminated. As indicated above, the closing of valve 326 can be manually initiated or can be done under the control of a logical system involving the float valves and switches. In addition to terminating operation of the tower by reason of conditions associated with the main reservoir 319, such as a desire for terminating irrigation, or for generating electricity when the tower is used for this purpose, operation of the tower is also terminated when weather conditions are such that the wind acting on the tower would exert a drag force that would tend to overstess the tower. The actual working forces on the tower are relatively small arising mainly from a small pressure deferential between the air inside the tower and the air outside the tower, with the result that shells 304 can be quite lightweight. Nevertheless, the tower will present a significant aerodynamic cross-section to the wind with the result that adverse weather could seriously damage the tower. When such a situation arises, operation of the tower is suspended in the manner described above, and mechanism 305 is actuated to retract tubes 306 thereby nesting shells 304. The height of the tower is then reduced to a fraction of its deployed size with the result that the cross-section of the tower is significantly reduced and survival of the tower is assured. When the wind abates, the tower can be erected by activating mechanism 305 and operation of the tower initiated in the manner described above.

Alternative to telescoping tubes 306, core 301 may take the form shown in FIG. 12 and a pulley, flexible cable arrangement utilized deploy and stow the shells.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

We claim:

1. A method for generating electricity in an arid environment using an open duct such as a canyon that is closed at one end and open at the other, said method comprising:
   (a) erecting an air dam at the open end of the canyon;
   (b) locating windmill apparatus at the base of the dam; and
   (c) spraying water into air entering the duct thereby cooling such air and causing it to flow downwardly toward the base of the dam and through the windmill aparatus.

2. A method according to claim 1 wherein the air cam is suspended from supports built into terrain located above the exit of the air dam.

3. A method according to claim 2 wherein the air dam is flexible.

4. A method according to claim 1 wherein the water sprayed into the air is brackish.

5. A method according to claim 4 wherein canals are provided in the floor of the canyon to carry off excess water that does not evaporate in the air.

6. A method for concentrating brine utilizing the method of claim 4 including the step of collecting the liquid not evaporated in the air.

7. A method according to claim 1 wherein water is sprayed into the air in the canyon below the level of the canyon walls to compensate for the compression and heating of the air as it falls toward the base of the dam.

8. A system for generating electricity in an arid environment using an open duct such as a canyon that is closed at one end and open at the other comprising:
   (a) an air dam erected at the open end of the canyon;
   (b) windmill apparatus in an exit at the base of the dam for connecting the air inside the canyon to the air outside; and
   (c) water spray means associated with the canyon for spraying water into the air in the canyon whereby the air is cooled by evaporation of the water and flows downwardly towards the base of the dam and through the windmill apparatus.

9. A system according to claim 8 wherein the air dam is a flexible curtain.

10. A system according to claim 9 including suspension means for supporting the flexible curtain from its top.

11. A system according to claim 10 wherein the suspension means includes supports built into the canyon above the exit of the dam.

12. A system according to claim 11 wherein the suspension means includes suspension towers on opposite sides of the open end of the canyon, a suspension cable strung across the open end of the canyon between the towers, and support cables between the suspension cable on the top of the flexible curtain for supporting the curtain across the open end of the canyon.

13. A system according to claim 8 wherein the water spray means includes a plurality of towers in the canyon for spraying water into the air at least at an elevation corresponding to the elevation of the sides of the canyon.

14. A system according claim 13 wherein the water of the spray is salty water.

15. A system according to claim 14 wherein more water is sprayed into the air then can be absorbed by the dry air, and wherein the canyon is provided with means for carrying off the excess water.

16. A system for concentrating brine utilizing the apparatus of claim 14 including means for collecting salty water not evaporated in the air.

17. A system according to claim 8 including a cover extending across the canyon for covering the same except for an opening adjacent the closed end of the canyon.

18. A system according to claim 17 including cover suspension means for suspending the cover over the canyon.

19. A system according to claim 18 wherein the cover suspension means includes a pair of towers on opposite sides of the canyon, a suspension cable strung across the canyon interconnecting the towers, and a plurality of support cables between the suspension cable for supporting the cover.

20. A system according to claim 18 wherein the suspension means includes gas-tight pockets in the cover, such pockets being filled with a gas that is lighter than air.

21. A system according to claim 17 wherein the elevation of the closed end of the canyon is greater than the elevation of the open end of the canyon, and the cover covers the lower portion of the canyon.

22. A system according to claim 21 including at least one air dam intermediate the air dam at the open end of the canyon and the opening adjacent to the closed end of the canyon, the intermediate air dam having windmill apparatus at its base.

23. A system according to claim 21 wherein said cover is provided with a plurality of enclosed, gas-tight pockets which contain a lighter-than-air gas.

24. A system according to claim 17 including a vertical tower surrounding the opening, the water spray being applied to the air at the top of the tower.

25. A system according to claim 17 wherein said cover is provided with a plurality of enclosed, gas-tight pockets which are filled with a lighter-than-air gas.

26. A system for generating electricity in an arid environment using a generally vertical tower with an opening at the top for warm air to enter, spray means for spraying water into the tower to cool the air by evaporation of the sprayed water for causing the air in the tower to flow downwardly through an air turbine in the tower, and wherein the tower is suspended from its top.

27. A system according to claim 26 wherein the spray means sprays water into the upper portion of the tower.

28. A system according to claim 26 wherein the air turbine is located in an opening in the bottom of the tower.

29. A system according to claim 26 wherein the tower is constructed adjacent a cliff and is suspended from the top of the cliff.

30. A system for generating electricity in an arid environment using an enclosed duct such as a generally vertical tower of length L and a hydraulic diameter D with an opening at the top for warm air to enter the tower, spray means for spraying water into the upper portion of the tower to cool the air by evaporation of the sprayed water for causing the air in the tower to flow downwardly through an opening in the bottom of the tower, and air turbine means associated with the tower responsive to the air that flows downwardly through the tower, the improvement including means at the top of the tower for increasing the time during which the water spray remains in contact with the air.

31. The improvement of claim 30 wherein the means at the top includes air guides that direct air into the open at the top of the tower.

32. The improvement of claim 30 including means adjacent to the top of the tower to collect water that is not evaporated by the air and to recirculate the collected water into the spray.

33. A tower for generating electricity in an arid environment comprising:
(a) a central vertically disposed core;
(b) an articulated cover operatively associated with the core;
(c) selectively operable means for raising the cover from a retracted to an extended position and for lowering the cover from an extended position to a retracted position;
(d) spray means for spraying water into the tower when the cover is in its extended position for cooling the air in the tower and increasing its density; and
(e) windmill apparatus below the cover responsive to the flow of air through the tower for generating electricity.

34. A tower according to claim 33 wherein the core is rigid.

35. A tower according to claim 34 including a hoop at the top of the core for supporting the cover which is flexible, the selectively operable means effective to raise and lower the cover relative to the core.

36. A tower according to claim 35 wherein water is piped to the spray means through the core.

37. A tower according to claim 33 wherein the core is telescopically arranged.

38. A tower according to claim 34 wherein the cover is in the form of a plurality of nestable shells.

39. In an open cycle heat engine that utilizes an elongated generally vertically disposed conduit wherein a heat induced positive buoyancy flux is created (e.g., by heating the air in the conduit near the bottom or cooling the air in the conduit near the top), the improvement comprising supporting the conduit by suspending the same from the top thereof.

40. The invention of claim 39 wherein the support for the conduit is built into the terrain at a level above the bottom of the conduit.

41. A system for generating electricity in an arid environment comprising: an enclosed, generally vertical duct of length L and hydraulic diameter D with an entrance opening at the top for receiving warm, dry ambient air; spray means for spraying water into the air in the duct at least adjacent the top, thereby cooling the air, which flows downwardly in the duct; the duct having an exit opening near the bottom for providing egress of air flowing downwardly therethrough for generating power, the duct being suspended from its top.

42. A system according to claim 41 wherein the duct is adjacent a cliff, and is suspended from the top of the cliff.

43. A system according to claim 42 wherein the cliff forms at least a part of the duct.

44. A system for generating electricity in an arid environment using an enclosed duct such as a generally vertical tower with an opening at the top for warm air to enter, spray means for spraying water into the upper portion of the tower to cool the air by evaporation of the sprayed water for causing the air in the tower to flow downwardly through an air turbine located in the tower, and wherein the duct is formed of a central rigid core having flexible walls, and having means for suspending vertically retractable flexible walls from the top of the tower.

45. The improvement of claim 44 wherein the walls are foldable vertically.

46. The improvement of claim 44 wherein the walls are foldable horizontally like a shower curtain.

47. The improvement of claim 44 wherein the walls are hinged slats.

* * * * *